May 15, 1923.
A. SKUPIEN
SLED
Filed Oct. 18, 1921  2 Sheets-Sheet 1
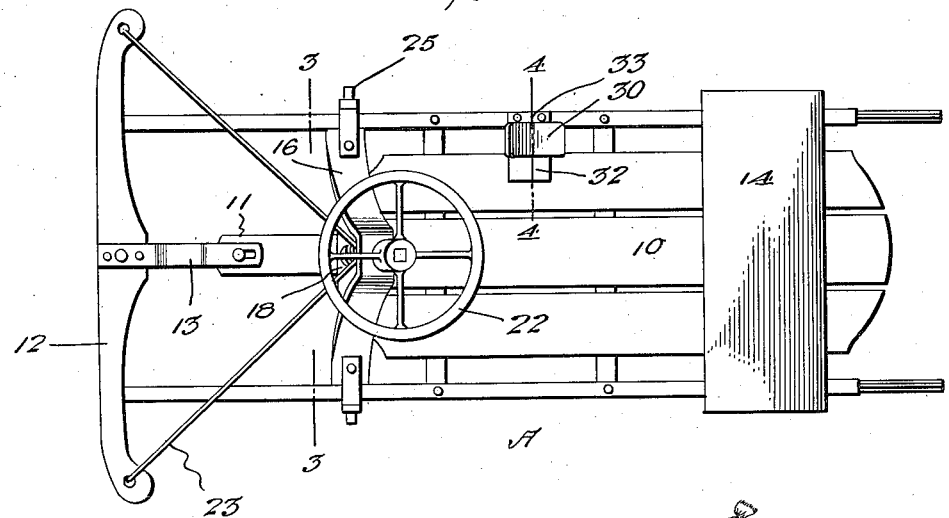
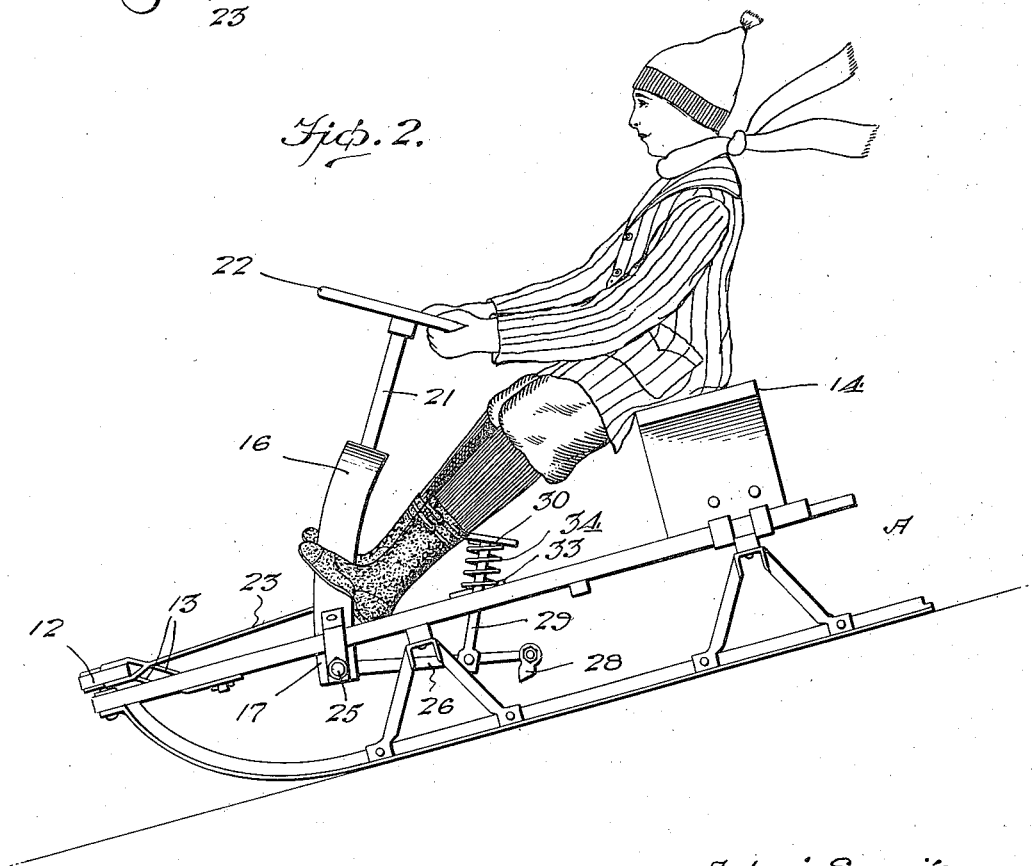
Antoni Skupien
INVENTOR
BY Victor J. Evans
ATTORNEY
WITNESS:

May 15, 1923.　　　　　　　　　　　　　　　　　　　1,455,032
A. SKUPIEN
SLED
Filed Oct. 18, 1921　　　　2 Sheets-Sheet 2
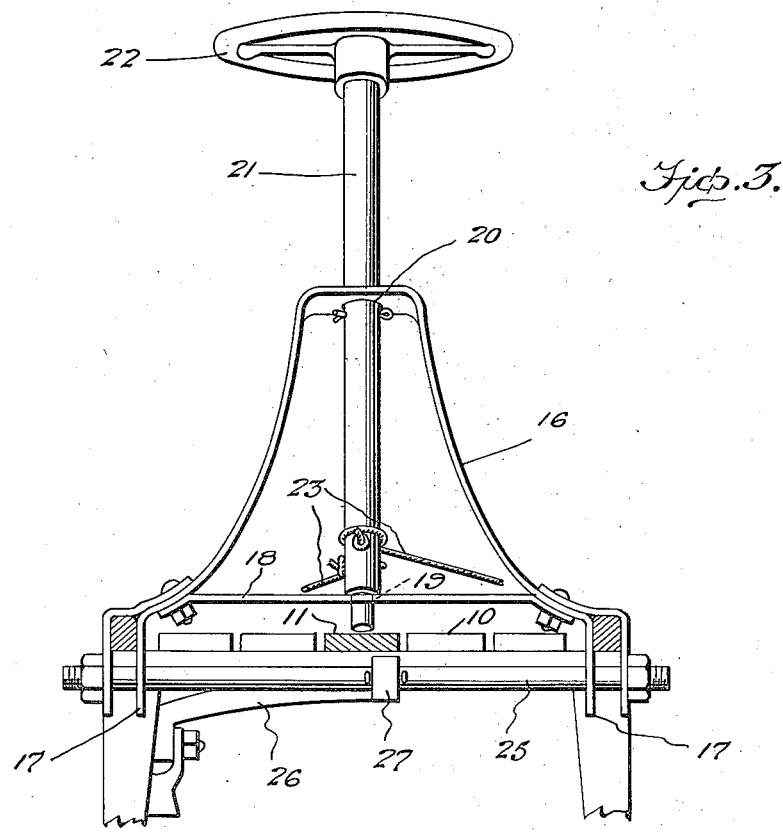
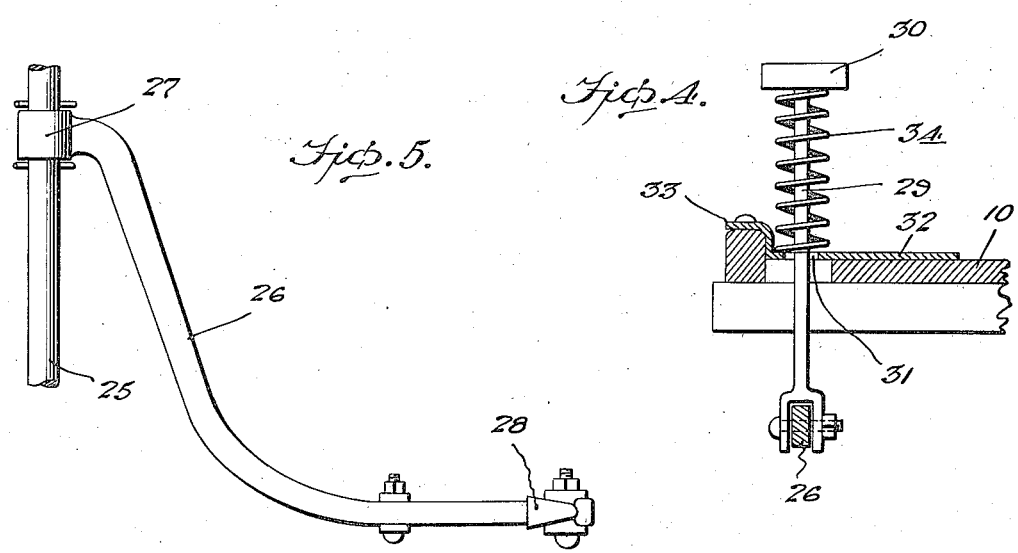
Antoni Skupién, INVENTOR
BY Victor J. Evans, ATTORNEY Patented May 15, 1923.

1,455,032

UNITED STATES PATENT OFFICE.

ANTONI SKUPIÉN, OF PORT HENRY, NEW YORK.

SLED.

Application filed October 18, 1921. Serial No. 508,462.

*To all whom it may concern:*

Be it known that I, ANTONI SKUPIÉN, a citizen of Poland, residing at Port Henry, in the county of Essex and State of New York, have invented new and useful Improvements in Sleds, of which the following is a specification.

This invention comprehends the provision of a sled equipped with means including a steering post for guiding the sled, and a foot actuated brake.

The principal object of the present invention resides in the provision of a substantially yoke-shaped member which serves as a support for the steering post, and also a support for the shaft upon which the braking element is movably mounted.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views and wherein:—

Figure 1 is a top plan view of the sled constructed in accordance with the invention.

Figure 2 is a side elevation.

Figure 3 is a sectional view taken on line 3—3 of Figure 1.

Figure 4 is a sectional view taken on line 4—4 of Figure 1.

Figure 5 is a detail view of the brake member.

Referring to the drawings in detail, A indicates a sled of wellknown construction, the top 10 of which is provided with a reduced extension 11, which is connected to the transversely disposed steering bar 12 through the instrumentality of iron strips 13. These strips are secured to the opposed sides of the bar 12, and have their corresponding extremities pivotally connected with the extension 11. A seat 14 of any suitable character is mounted upon the frame of the sled as illustrated. A substantially yoke-shaped member 16 rises from the frame of the sled adjacent the forward end thereof, while the free ends of said member are arranged substantially parallel as at 17. This member includes a transverse bar 18 which is provided with a central opening 19 arranged in alinement with the opening 20 at the upper end of the member 16. A steering post 21 is journaled in said openings, projecting an appreciable distance above the yoke-shaped member, and equipped with a steering wheel 22. Flexible elements 23 have their outer ends secured to the extremities of the steering bar 12, while the other ends of said elements are secured to the steering post in a manner to be alternately wound about and unwound therefrom incident to the turning of the steering post to guide the sled.

The parallel extremities 17 of the yoke shaped member constitute bearings for a shaft 25 which is arranged transversely of the top 10 of the sled. A curved braking member 26 has one end formed with an eye or loop 27 which surrounds the shaft 25 for movement thereon, the free end of this shaft terminating in close proximity to one of the runners of the sled and equipped with a brake shoe 28. Rising from the braking member is a standard 29 which carries a pedal 30 so that when the pedal is depressed, the brake shoe is moved into contact with the ground or surface as will be readily understood. The standard 29 passes through a slot 31, provided in a plate 32, the latter overlying the top 10 of the sled and being formed with an attaching flange 33 which is suitably secured to one side of the frame of the sled. A coiled spring 34 surrounds the standard, and has one end bearing against the plate 32, and its opposite end bearing against the pedal to normally hold the latter and the brake shoe elevated. Manifestly, I have devised a construction, wherein the sled can be very conveniently and easily guided, and the movements of the sled quickly checked by merely depressing upon the pedal 30 as the occasion requires.

While it is believed that from the foregoing description the nature and advantages of the invention will be readily apparent I desire to have it understood that I do not limit myself to what is herein shown and described, and that such changes may be resorted to when desired as fall within the scope of what is claimed.

What I claim is:

1. The combination with the frame and steering rod of a sled, of a forwardly projecting reduced extension on the frame, strips pivotally connecting said extension and steering rod, a yoke shaped member vertically mounted on the frame provided with a central opening at the top and having its ends parallel on either side of the frame, a bar provided with an opening in alinement with that of the yoke and having its ends in parallel alinement with those of the yoke connected with said yoke, a steering post journaled through the openings in said yoke and bar, and flexible elements connecting the steering rod with the steering post and adapted to be alternately wound about and unwound therefrom upon turning of the steering post.

2. In a sled having a seat mounted at the rear and a steering rod at the forward end the combination of a forwardly projecting reduced portion of the frame, strips mounted on the steering rod and pivoted to said extension, a yoke shaped member mounted on the frame provided with central openings and having its ends mounted on either side of the frame in parallel alinement, a steering post journaled through the openings in said yoke, a shaft journaled between the ends of said yoke, a brake arm journaled on said shaft, operating means carried by the brake arm between the seat and steering post, and flexible elements connecting the steering rod and steering post.

In testimony whereof I affix my signature.

ANTONI SKUPIÉN.